US011225232B2

(12) United States Patent
Shi et al.

(10) Patent No.: US 11,225,232 B2
(45) Date of Patent: Jan. 18, 2022

(54) FUZZY LOGIC BASED TRACTION CONTROL FOR ELECTRIC VEHICLES

(71) Applicant: CHONGQING JINKANG POWERTRAIN NEW ENERGY CO., LTD., Chongqing (CN)

(72) Inventors: Junzhe Shi, Santa Clara, CA (US); Xingyu Zhou, Santa Clara, CA (US); Min Tian, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 125 days.

(21) Appl. No.: 16/730,178

(22) Filed: Dec. 30, 2019

(65) Prior Publication Data

US 2021/0197778 A1  Jul. 1, 2021

(51) Int. Cl.
  *B60T 8/174*    (2006.01)
  *B60L 3/10*     (2006.01)
  *B60T 8/175*    (2006.01)
  *B60T 8/1761*   (2006.01)
  *B60W 40/064*   (2012.01)

(52) U.S. Cl.
  CPC .............. *B60T 8/174* (2013.01); *B60L 3/108* (2013.01); *B60T 8/175* (2013.01); *B60T 8/1761* (2013.01); *B60W 40/064* (2013.01); *B60L 2240/423* (2013.01)

(58) Field of Classification Search
  CPC ........ B60T 8/174; B60T 8/175; B60T 8/1761; B60T 2270/202; B60L 3/108; B60L 2240/423; B60L 15/20; B60L 2240/64; B60L 2240/465; B60L 2240/10; B60L 2240/12; B60L 2240/14; B60L 2240/24; B60W 40/064; Y02T 10/72
  See application file for complete search history.

(56) References Cited

U.S. PATENT DOCUMENTS 9,162,586 B2 * 10/2015 Tang .................. B60L 15/2036

\* cited by examiner

*Primary Examiner* — Yuen Wong
(74) *Attorney, Agent, or Firm* — Cooper Legal Group, LLC

(57) ABSTRACT

Fuzzy-logic based traction control for electric vehicles is provided. The system detects a wheel slip ratio for each wheel. The system receives an input torque command. The system determines a slip error for each wheel based on the wheel slip ratio for each wheel and a target wheel slip ratio. The system, using the fuzzy-logic based control selection technique, selects a traction control technique from one of a least-quadratic-regulator, a sliding mode controller, a loop-shaping based controller, or a model predictive controller. The system generates a compensation torque value for each wheel. The system generates the compensation torque value based on the traction control technique selected via the fuzzy-logic based control selection technique and the slip error for each wheel. The system transmits commands to actuate drive units of the vehicles based on the compensation torque value.

18 Claims, 6 Drawing Sheets

FUZZY LOGIC BASED TRACTION CONTROL FOR ELECTRIC VEHICLES

BACKGROUND

Vehicles such as automobiles can include can include sensors. The sensors can determine the speed or acceleration of the vehicle.

SUMMARY

At least one aspect is directed to a system to control traction of an electric vehicle. The system can include a traction control system including one or more processors and memory. The traction control system can identify a state of the electric vehicle and a condition of a road in contact with one or more of a plurality of wheels of the electric vehicle. The traction control system can detect a wheel slip ratio for each wheel of the plurality of wheels of the electric vehicle. The traction control system can receive an input torque command from a vehicle control unit of the electric vehicle. The traction control system can determine a slip error for each wheel of the plurality of wheels. The traction control system can determine the slip error based on the wheel slip ratio for each wheel of the plurality of wheels and a target wheel slip ratio for each wheel of the plurality of wheels. The traction control system can input the state of the electric vehicle and the condition of the road into a fuzzy-logic based control selection technique. The traction control system, using the fuzzy-logic based control selection technique, select a traction control technique from one of a least-quadratic-regulator, a sliding mode controller, a loop-shaping based controller, or a model predictive controller. The traction control system can generate a compensation torque value for each wheel of the plurality of wheels. The traction control system can generate the compensation torque value based on the traction control technique selected via the fuzzy-logic based control selection technique and the slip error for each wheel of the plurality of wheels. The traction control system can transmit one or more commands corresponding to the compensation torque value for each wheel of the plurality of wheels to one or more drive units of the plurality of wheels of the electric vehicle to control traction for the electric vehicle.

At least one aspect is directed to a method of controlling traction of an electric vehicle. The method can be performed by a traction control system having one or more processors and memory. The method can include the traction control system detecting a wheel slip ratio for each wheel of a plurality of wheels of the electric vehicle. The method can include the traction control system receiving an input torque command from a vehicle control unit of the electric vehicle. The method can include the traction control system identifying a state of the electric vehicle and a condition of a road in contact with one or more of the plurality of wheels of the electric vehicle. The method can include the traction control system determining a slip error for each wheel of the plurality of wheels. The method can include the traction control system determining the slip error based on the wheel slip ratio for each wheel of the plurality of wheels and a target wheel slip ratio for each wheel of the plurality of wheels. The method can include the traction control system inputting the state of the electric vehicle and the condition of the road into a fuzzy-logic based control selection technique. The method can include the traction control system selecting, using the fuzzy-logic based control selection technique, a traction control technique from one of a least-quadratic-regulator, a sliding mode controller, a loop-shaping based controller, or a model predictive controller. The method can include the traction control system generating a compensation torque value for each wheel of the plurality of wheels. The method can include the traction control system generating the compensation torque value based on the traction control technique selected via the fuzzy-logic based control selection technique and the slip error for each wheel of the plurality of wheels. The method can include the traction control system transmitting one or more commands corresponding to the compensation torque value for each wheel of the plurality of wheels to one or more drive units of the plurality of wheels of the electric vehicle to control traction for the electric vehicle.

At least one aspect is directed to an electric vehicle. The electric vehicle can include a traction control system including one or more processors and memory. The traction control system can detect a wheel slip ratio for each wheel of a plurality of wheels of the electric vehicle. The traction control system can receive an input torque command from a vehicle control unit of the electric vehicle. The traction control system can determine a slip error for each wheel of the plurality of wheels. The traction control system can determine the slip error based on the wheel slip ratio for each wheel of the plurality of wheels and a target wheel slip ratio for each wheel of the plurality of wheels. The traction control system can identify a state of the electric vehicle and a condition of a road in contact with one or more of the plurality of wheels of the electric vehicle. The traction control system can input the state of the electric vehicle and the condition of the road into a fuzzy-logic based control selection technique. The traction control system, using the fuzzy-logic based control selection technique, select a traction control technique from one of a least-quadratic-regulator, a sliding mode controller, an loop-shaping based controller, or a model predictive controller. The traction control system can generate a compensation torque value for each wheel of the plurality of wheels. The traction control system can generate the compensation torque value based on the traction control technique selected via the fuzzy-logic based control selection technique and the slip error for each wheel of the plurality of wheels. The traction control system can transmit one or more commands corresponding to the compensation torque value for each wheel of the plurality of wheels to one or more drive units of the plurality of wheels of the electric vehicle to control traction for the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
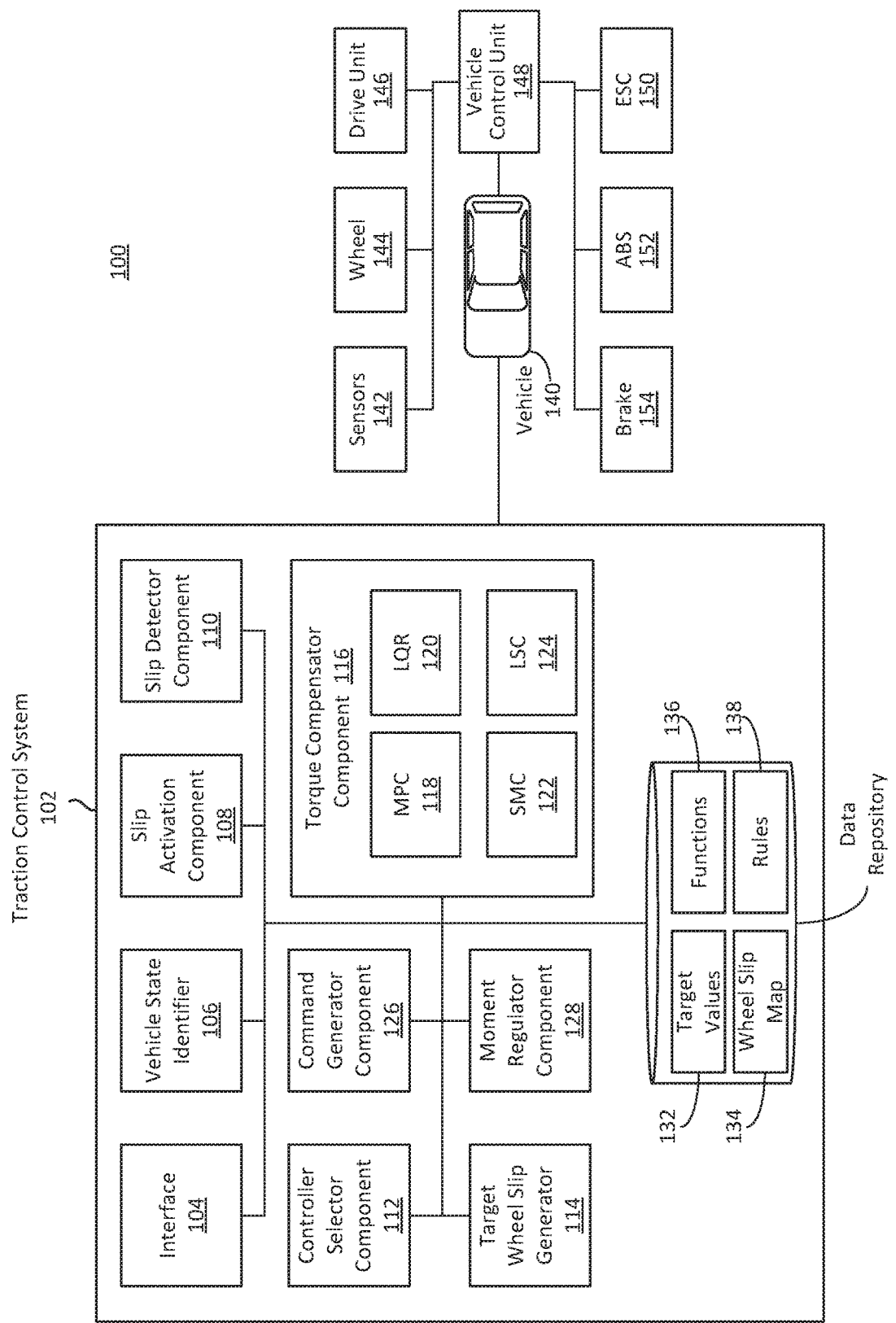
FIG. 1 depicts a block diagram depicting an example system to control traction of an electric vehicle, in accordance with an implementation.

Following below are more detailed descriptions of various concepts related to, and implementations of, methods, apparatuses, and systems of controlling traction of an electric vehicle. The various concepts introduced above and discussed in greater detail below may be implemented in any of numerous ways.

Systems and methods of this technical solution are directed to controlling traction of an electric vehicle using a fuzzy logic traction control technique selector. An electric vehicle can have all-wheel drive functionality whereby each of the four wheels of the vehicle is driven by a separate drive unit (e.g., electric motor). To provide traction control, the system of this technical solution can receive multiple inputs. The inputs can include, for example, an estimated wheel slip ratio, a desired wheel slip ratio, and a driver input torque command from a Vehicle Control Unit ("VCU"). The system can process these inputs to generate an output that includes a compensated torque value for each individual drive unit. This technical solution can provide an improved traction control system by: 1) providing an improved compensated torque command that is customized for each wheel of a 4-drive-unit all-wheel drive electric vehicle; 2) providing a fuzzy logic based controller selector that is designed and constructed to adaptively switch between different traction control techniques (e.g., least-quadratic-regulator, a sliding mode controller, an loop-shaping based controller, or a model predictive controller) during operation of the vehicle so as to use an optimal control technique based on the current scenario; 3) provide improvements to the traction control techniques; and 4) improve safety by providing a vehicle moment protector that can regulate the vertical moment that can result from a difference between individual motor torques.

All-wheel drive ("AWD") can provide improved traction and handling than vehicles with only rear-wheel-drive or only front-wheel-drive. AWD systems can allocate power from a drive unit to both drive axles in a vehicle. In the scenario where one drive axel loses traction, the vehicle with AWD can still operate with decent traction by allocating the drive power to the other drive axel. Additionally, the AWD vehicle can maintain near-neutral-steer when cornering, while the FWD and RWD are more likely to go under-steer and over-steer, respectively. Vehicles with different types of drive units can include AWD systems, including, for example, gasoline/diesel engines, electrical motors, and hybrid drive units which are the composite of gasoline/diesel engines and electrical motors.

To control and improve the traction acting on individual wheels in an AWD system, this technical solution can control the wheel slip of each of the individual wheels by providing a torque compensation command to the individual drive unit coupled to the individual wheel. Control systems that provide wheel slip control for different types of drive units may be highly customized based on the electrical or mechanical characteristics of the drive unit. As a result, the wheel slip control techniques developed for AWD vehicles with a gasoline/diesel engine or a hybrid drive unit perform poorly when applied to an AWD vehicle consisting of electric motors. In addition, to improve the traction acting on the wheels, this technical solution can adaptively switch to an appropriate traction control techniques for the current operating scenario of the electric vehicle, thereby removing constraints by not forcing the traction control system to use a single traction control technique for all operating scenarios. By adaptively switching between different traction control techniques, the this technical solution can improve traction activing on the wheels while reducing wasted power consumption due to unnecessary computing resource utilization or unnecessary power delivered to a drive unit.

FIG. 1 depicts a block diagram depicting an example system to control traction of an electric vehicle. The system 100 can include at least one traction control system 102. The traction control system 102 can be referred to as or include one or more processors, one or more computing devices, one or more processing circuits, one or more processing chips, or one or more data processing systems. The traction control system 102 can include at least one interface 104, at least one vehicle state identifier 106, at least one slip activation component 108, at least one slip detector component 110, at least one controller selector component 112, at least one target wheel slip generator 114, at least one torque compensator component 116, at least one command generator component 126, at least one moment regulator component 128, and at least one data repository 130. The torque compensator component 116 can be configured with one or more traction control techniques, including, for example, a model predictive controller ("MPC") 118, a least-quadratic-regulator ("LQR") 120, a sliding mode controller ("SMC") 122, and a loop-shaping based controller ("LSC") 124. The traction control system 102 can include hardware or a combination of hardware and software, such as communications buses, circuitry, processors, communications interfaces, among others. The traction control system 102, or one or more component thereof, can be programmed using C code, or other programming language. The traction control system 102 can be flashed on one or more chips, chip boards, microprocessors, or other computing device. The traction control system 102 can reside on or within a corresponding vehicle 140 (e.g., a host vehicle). The data repository 130 can store, manage, maintain, or reference one or more data structures, data files, or indexes. For example, the data repository 130 can include or store target values 132, a wheel slip map 134, functions 136, or rules 138. The target values 132 can refer to or include desired wheel slip values, target wheel slip values, or thresholds. The wheel slip map 134 can include desired wheel slip ratios based on an operating scenario or other function. The functions 136 can refer to functions such as MPC 118, LQR 120, SMC 122, or LSC 124, or other functions used by the traction control system 102 to control traction of the electric vehicle 140. The rules 138 can include a fuzzy logic-based rules to select a type of traction control technique for a particular operating scenario. Each of the components of the traction control system 102 can be implemented using hardware or a combination of software and hardware. Each component of the traction control system 102 can include logical circuitry (e.g., a central processing unit or CPU) that responses to and processes instructions fetched from a memory unit (e.g., memory 615 or storage device 625). Each component of the traction control system 102 can include or use a microprocessor or a multi-core processor. A multi-core processor can include two or more processing units on a single computing component. Each component of the traction control system 102 can be based on any of these processors, or any other processor capable of operating as described herein. Each processor can utilize instruction level parallelism, thread level parallelism, different levels of cache, etc. For example, the traction control system 102 can include at least one logic device such as a computing device or server having at least one processor to communicate via a network.

The components and elements of the traction control system 102 can be separate components, a single component, or part of the traction control system 102. For example, the interface 104, the vehicle state identifier 106, the slip activation component 108 and the torque compensator component 116 (and the other components or elements of the traction control system 102) can include combinations of hardware and software, such as one or more processors configured to initiate stop commands, initiate motion commands, and transmit or receive timing data, for example.

One or more component of the traction control system 102 can be hosted on or within a vehicle 140. One or more components of the traction control system 102 can reside outside or remote from the vehicle 140, and be in communication with the vehicle for at least a certain time period. For example, portions of data illustrated on the data repository 130 can reside on a remote server, such as in a cloud of servers, that maintains the functions 136 or wheel slip map 134, and can be accessed by the traction control system 102 (e.g., through a network) at various times (e.g., every 12 hours or 24 hours during an update process). The components of the traction control system 102 can be connected or communicatively coupled to one another. The connection between the various components of the traction control system 102 can be wired or wireless, or any combination thereof. Counterpart systems or components can be hosted on other vehicles to enable communication or coordination between vehicles.

The vehicle 140 can communicate using a network, which can include computer networks such as the internet, local, wide, near field communication, metro or other area networks, as well as satellite networks or other computer networks such as voice or data mobile phone communications networks, and combinations thereof. The network can include or constitute an inter-vehicle communications network, e.g., a subset of components including the traction control system 102 and components thereof for inter-vehicle data transfer. The network can include a point-to-point network, broadcast network, telecommunications network, asynchronous transfer mode network, synchronous optical network, or a synchronous digital hierarchy network, for example. The network can include at least one wireless link such as an infrared channel or satellite band. The topology of the network can include a bus, star, or ring network topology. The network can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The system 100 can include or interface with one or more vehicles 140. The vehicle 140 can refer to any type of vehicle or automobile such as cars, trucks, vans, sports utility vehicles, motorcycles, self-driving vehicle, or driver assist vehicle. The vehicle 140 can be an electric vehicle that is powered by a battery pack including one or more battery cells (e.g., lithium-ion battery cells). The vehicle 140 can include an onboard computing unit. The onboard computing unit can include one or more of hardware, software or firmware. The onboard computing unit can include digital components or circuitry, including, for example, one or more component depicted in FIG. 6.

The onboard computing unit can include or interface with, for example, a vehicle control unit ("VCU") 148. The VCU 148 can be referred to or include an electronic control unit ("ECU") or onboard computing unit that can provide drive-by-wire functionality. The VCU 148 can include or be referred to as an automotive computer, and can include a processor or microcontroller, memory, embedded software, inputs/outputs and communication link(s). The VCU 148 can include hardware and software to perform the functions. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the onboard computing unit of the vehicle 140 can query one or more component or module of vehicle 140 to determine a status of the vehicle 140, which can include, for example, a location or GPS position of the vehicle, speed of the vehicle, acceleration of the vehicle, turn angle of the vehicle, orientation of the vehicle, throttle of the vehicle, brake status or brake amount, wheel slip, wheel slip ratio, driver torque input, or other information.

The vehicle 140 can include or interface with one or more sensors 142. The sensors 142 can be coupled to or associated with a vehicle 140. The sensors 142 can provide information to the traction control system 102. The sensors 142 can be part of the vehicle 140, or remote from the vehicle 140. Sensors 142 can include, for example, a 6-DOF inertia measurement unit, wheel speed sensors, tire pressure sensors, or steering angle sensor. Sensors 142 of the vehicle 140 can include accelerometers, gyroscopes, weight sensors, or proximity sensors, that can collect, detect or determine vehicle dynamics information such as orientation data, velocity, or weight. The IMU sensor can be an electronic device that measures and reports a vehicle's specific force, angular rate, and sometimes the orientation of the body, using a combination of accelerometers, gyroscopes, or magnetometers.

The one or more vehicle 140 can include sensors that are designed, constructed, configured or operational to detect vehicle dynamics information used to control traction. Sensors 142 can include sensors that detect, for example, an automobile layout, vehicle powertrain information, braking system information, steering information, suspension information, and wheel and tire information. The sensors 142 can determine the speed of each of the individual wheels of the electric vehicle 140, longitudinal vehicle velocity, steering angle, driving mode, vehicle state, or road surface parameters. The onboard computing unit or sensors can detect or identify vehicle dynamics information based on aerodynamics information such as drag coefficient, aerodynamics, center of pressure, downforce, ground effect in the vehicle. The onboard computing unit or sensors 142 can detect or identify vehicle dynamics information related to the geometry of the vehicle, such as steering geometry, axle track, camber angle, caster angle, roll center, scrub radius, steering ratio, toe, or wheelbase. The onboard computing unit or sensors can detect or identify vehicle dynamics information related to mass of the vehicle, such as center of mass, moment of inertia, roll moment, sprung mass, unsprung mass, or weight distribution. The onboard computing unit or sensors can detect or identify vehicle dynamics information related to motion of the vehicle, such as body flex, body roll, bump steer, directional stability, critical speed, noise, vibration, harshness, pitch, ride quality, roll, speed wobble, understeer, oversteer, lift-off oversteer, fishtailing, weight transfer, load transfer, yah. The onboard computing unit or sensors can detect or identify vehicle dynamics information related to tire information, such as camber thrust, circle of forces, contact patch, cornering force, ground pressure, pneumatic trail, radial force variation, relaxation length, rolling assistance, self-aligning torque, slip angle, slip, steering ratio, tire load sensitivity. The onboard computing unit or sensors can detect or identify vehicle dynamics information related to the road or surface of the parking zone, such as banked turn, cross slope, drainage gradient, cant, superelevation, road slipperiness, split friction, surface roughness, or texture. The onboard computing unit can retrieve vehicle dynamics information stored in memory of the vehicle 140.

The vehicle 140 can include multiple wheels 144. The vehicle 140 can include three wheels, four wheels, six wheels or more. For example, vehicle 140 can include four wheels 144, with two wheels 144 located towards the front of the vehicle 140 and two wheels 144 located towards the rear of the vehicle 140. Wheel 144 can refer to a tire or a rim. The wheels 144 can have a dimension, such as a width and a diameter. Example dimensions can be 6.5×15 inches, 9.5×20 inches, 10×20 inches, 10×22 inches, or 11×22 inches. Wheels 144 can include various materials, including, for example, rubber, synthetic rubber, fabric, wire, carbon black, or other materials and compounds.

The vehicle 140 can include one or more drive units 146. The vehicle 140 can include two drive units 146. For example, a first drive unit 146 can be coupled to a front axle that is coupled to each of two front wheels, and a second drive unit 146 can be coupled to a rear axle that is coupled to each of two rear wheels. The vehicle 140 can include three drive units 146. For example, a first drive unit 146 can be coupled to a front axle that is coupled to each of two front wheels, a second drive unit 146 can be coupled to one of the two rear wheels 144 via an axle, and the third drive unit 146 can be coupled to the other of the two rear wheels 144 via an axle. In another example, a first drive unit 146 can be coupled to a rear axle that is coupled to each of two rear wheels, a second drive unit 146 can be coupled to one of the two front wheels 144 via an axle, and the third drive unit 146 can be coupled to the other of the two front wheels 144 via an axle. The vehicle 140 can include four drive units 146 where each drive unit 146 is coupled to a corresponding one of the four wheels 144 of the vehicle. The vehicle 140 can include a separate, individual drive unit 146 for each wheel 144. The drive unit 146 can be coupled to the wheel 144. The drive unit 146 can be coupled to the wheel 144 via an axle. The drive unit 146 can rotate the axle which can rotate the wheel 144 to provide torque to the wheel and cause the vehicle 140 to move. The drive unit 146 can be an electric drive unit, such as an actuator or an electric motor. The drive unit 146 can include, for example, a DC motor, brushless DC motor, permanent magnet synchronous motor, three phase AC induction motor, or a switched reluctance motor. Each drive unit 146 can receive an individual torque command or compensated torque command from one or more component of system 100. The drive unit 146 can actuate or rotate the axle or wheel 144 responsive to the torque command.

The vehicle can include one or more of a brake 154, an anti-lock brake system ("ABS") 152 and electronic stability control ("ESC") 150. The brake 154 can refer to or include any electrical or mechanical device that can inhibit motion or rotation of the wheel 144 or axle by absorbing energy from the rotating system. The brake 154 can introduce friction to prevent the motion or rotation of the wheel 144. Brakes 154 can include disc brakes, drum brakes, or emergency brakes. Brakes 154 can include regenerative braking that uses the drive unit 146 to slow the car and put energy back into a battery pack of the vehicle. Brakes 154 can include a hydraulic power assist brake. Brakes 154 can be activated electronically (e.g., a command from the VCU 148) or mechanically (e.g., a driver pressing a mechanical brake pedal in the electric vehicle 140). Each wheel 144 can include or be associated with a corresponding brake 154. In some cases, one or more wheels 144 of the electric vehicle 140 can be associated with a brake 154. The vehicle 140 can include one or more different types of brakes 154.

The vehicle 140 can include an ABS 152. The ABS 152 can reduce or mitigate skidding of the vehicle 140 when applying the brakes 154. The ABS 152 can prevent the wheels 144 from locking up during braking, thereby maintaining tractive contact with the road surface. The ABS 152 can be configured with threshold braking and cadence braking technique. ABS 152 can reduce braking distance based on the type of road surface, such as wet or slippery road surface. The ABS 152 can include one or more of speed sensors, valves, pumps and a controller. The ABS 152 can include one or more channels to control the one or more valves in the brake line. The VCU 148 or other component of the traction control system 102 can receive an indication from the ABS 152 that indicates whether the ABS 152 is active or inactive. An active ABS 152 can refer to the ABS 152 actively pumping the brakes 154 so as to reduce the distance to stop the vehicle 140.

The vehicle 140 can include an ESC 150 that improves the stability of the vehicle 140 by detecting and reducing loss of traction (e.g., skidding). The ESC 150 can detect loss of steering control and automatically apply the brakes 154 to help steer the vehicle where the driver intends for the vehicle 140 to go. The ESC 150 can automatically apply brakes 154 to the wheels 144 individually to control for oversteer (e.g., via application of the brake 154 to the outer front wheel 144) or understeer (e.g., via application of the brake 154 to the inner rear wheel 144). The VCU 148 or other component of the traction control system 102 can receive an indication from the ESC 150 that indicates whether the ESC 150 is active or inactive. An active ESC 150 can refer to the ESC 150 actively pumping the brakes 154 so as to control understeer or oversteer.

The traction control system 102 can include an interface 104. The interface 104 can be designed, constructed and operational to receive information from one or more device, component, sensor 142, or network. The interface 104 can communicate with one or more device, sensor 142 or network. The interface 104 can receive information from the VCU 148, ABS 152, ESC 150, brakes 154, wheel 144 or drive unit 146. The interface 104 can facilitate communications among or between components of the traction control system 102. The interface 104 can include or provide one or more of a hardware interface, network interface, application programming interface, user interface, graphical user interface. The interface 104 can format data from one format to another in order to facilitate communications between the traction control system 102 and remote systems, or between components of the traction control system 102.

The interface 104 can receive data from one or more sensors 142 of the vehicle 140. The interface 104 can receive data such as wheel speed data, steering angle data, tire pressure data, 6-DOF data from an IMU, velocity information, longitudinal vehicle velocity data, driving mode, online vehicle state, road surface parameters, or other information that facilitates controlling traction of the vehicle. The interface 104 can receive the information using one or more techniques. The interface 104 can receive a data stream containing sensor information. The interface 104 can poll or ping the sensors 142 to obtain the sensor data For example, the interface 104 can transmit a request to a sensor 142 for the sensor data, or fetch the sensor data from one or more of the sensors 142. The sensors 142 can push sensor data to the interface 104. The interface 104 can periodically request or obtain sensor data. The interface 104 can request or obtain the sensor data based on a predetermined time interval such as, for example, every second, quarter of a second, tenth of a second, hundredth of a second, thousandth of a second, 2 seconds, 3 seconds, 4 seconds, 5 seconds or other time interval that facilitates determining vehicle dynamics.

The interface 104 can access data from data repository 130. The interface 104 can store data in data repository 130. The interface 104 can obtain sensor data and store the sensor data in the data repository 130 for further processing. The interface 104 can perform a lookup in the data repository to identify data or values, and update the data or values in the data repository 130. For example, the interface 104 can update the target values 132, wheel slip map 134, functions 136, or rules 138 by obtaining updated versions of the data structures of data files via an external electronic resource, such as a server.

The traction control system 102 can include a vehicle state identifier 106 designed, constructed, and operational to determine a state of the vehicle 140. The state of the vehicle 140 can refer to or include an operating state of the vehicle 140, driving mode of the vehicle 140, road condition, driving characteristic of the vehicle 140, or operating scenario. For example, the state of the vehicle 140 can indicate the vehicle 140 is in motion, driving on a highway, driving on a local road, or parked. The state of the vehicle 140 can indicate a driving mode of the vehicle 140, such as economy mode, comfort mode, sport mode, track mode, race mode. These driving characteristics can impact the suspension of the vehicle, gear shift ratios, acceleration, or traction control. The vehicle state identifier 106 can determine a condition of a road in contact with one or more of the wheels of the electric vehicle 140. The state of the vehicle 140 can include an indication of a road condition, such as wet, raining, snow, dry, sand, mud, or road temperature. The state of the vehicle 140 can refer to or include indications of a state of systems or components of the vehicle 140. For example, the state of the vehicle 140 can include indications of whether the ABS 152 is currently activated, whether the ESC 150 is currently activated, or whether the brakes 154 are currently activated. Currently activated can refer to the brake 154, ABS 52, or ESC 150 being applied to slow, control, or stop the vehicle 140. For example, the vehicle state identifier 106 can determine that the brake 154 is currently being pressed to stop the vehicle. The vehicle state identifier 106 can determine the state of the vehicle 140 based on receiving information from the VCU 148 or other components or sensors of the vehicle 140 to determine the state of the vehicle.

The traction control system 102 can include a slip activation component 108 designed, constructed and operational to activate or deactivate the traction control system 102 from applying a compensated torque command to control slip of the electric vehicle 140. The slip activation component 108 can determine to deactivate a wheel slip control technique based on the state of the electric vehicle 140. The slip activation component 108 can block, responsive to deactivation of the wheel slip control technique, transmission of the one or more commands based on the compensation torque value. For example, the traction control system 102 can generate a compensated torque value and command. The slip activation component 108 can determine, based on the vehicle state information obtained from the vehicle state identifier 106, to block or prevent transmission of the command to the drive unit 146 so as to prevent slip control.

The slip activation component 108 can be configured with one or more rules 138 that indicate whether to deactivate, block, or prevent slip control. The rules 138 can indicate to deactivate, block or prevent slip control when at least one of the brakes 154, ABS 152 or ESC 150 are active. The slip activation component 108 can determine, via the vehicle state identifier 106, that at least one of the brakes 154, ABS 152 or ESC 150 is active. The slip activation component 108, responsive to the determination, can block or prevent generation or transmission of the compensation torque value. For example, the slip activation component 108 can determine to disable the components of the traction control system 102 used to determine the slip error, select a traction control technique, generate a compensation torque value, and generate the compensation torque command. Disabling, or not invoking, or performing the processing can reduce computing resource utilization. Thus, the slip activation component 108 can determine, under certain vehicle states, to either disable, block, or prevent generation of a compensation torque value, or transmission of a compensation torque command to the drive unit 146. When the brake 154, electric stability control 150, and anti-lock braking system 152 are all in deactivation mode, the traction control system 102 can proceed with performing wheel slip control and torque compensation.

The traction control system 102 can include a slip detector component 110 designed, constructed and operational to determine a slip error of each wheel 144 of the vehicle 140. To do so, the slip detector component 110 can detect a wheel slip ratio for each wheel 144 of the vehicle 140. The slip detector component 110 can receive, from a vehicle control unit 148 of the vehicle 140 (e.g., electric vehicle), an input torque command. The input torque command can correspond to a driver pressing the acceleration pedal or other indication to accelerate the vehicle 140. The slip detector component 110 can determine a slip error for each wheel 144 wheel based on the wheel slip ratio for each wheel 144 and a target wheel slip ratio for each wheel 144.

Wheel slip can refer to the relative motion between a wheel 144 (e.g., tire) and a road surface on which the wheel 144 is moving. The slip detector component 110 can generate the slip based on the rotational speed of the wheel 144 being greater or less than the free-rolling speed, which can be referred to as a slip ratio or percent slip. The slip ratio can indicate the slipping behavior of the wheel 144 of the vehicle

140. When accelerating or braking a vehicle 140 equipped with wheels 144 having tires, the observed angular velocity of the wheel 144 may not match the expected velocity for pure rolling motion, which can indicate sliding between an outer surface of the rim of the wheel 144 and the road in addition to rolling due to deformation of the part of wheel 144 (or tire) above the area in contact with the road. When driving on dry pavement the fraction of slip that may be caused by actual sliding taking place between road and wheel 144 contact patch may be negligible in magnitude relative to a slippery surface. However, on soft or slippery surfaces, such as snow, mud, or ice, the speed difference between the expected angular velocity and the expected pure rolling motion can increase, thereby resulting in a greater slip ratio. The fraction of slip ratio due to that cause an be inversely related to speed of the vehicle 140. The difference between a theoretically calculated forward speed based on angular speed of the wheel 144 and a rolling radius, and actual speed of the vehicle 140, expressed as a percentage of the latter, can be referred to as the slip ratio.

The slip detector component 110 can determine the slip ratio as follows:

$$\text{Slip Ratio} = \left(\frac{\Omega R_C}{V} - 1\right),$$

where $\Omega$ is the angular velocity of the wheel 144, $R_C$ is the effective radius of the corresponding free-rolling wheel 144 (and tire), which the slip detector component 110 can determine from the revolutions per mile or kilometer, and V is the forward velocity of the vehicle 140. The slip detector component 110 can obtain the angular velocity from a sensor 142 of the vehicle. The sensor 142 can include an angular rate sensor, such as a gyroscope, electromechanical sensor, vibrating structure gyroscope, microelectromechanical gyroscope, ring laser gyroscope, or fibre optic gyroscope. The slip detector component 110 can determine the velocity of the vehicle using a sensor 142 such as a speedometer or a global positioning system.

In another example, the slip detector component 110 can determine the slip ratio for each wheel 144 of the vehicle based on the individual wheel speed, longitudinal vehicle velocity, and the steering angle. The slip detector component 110 can determine or estimate the wheel slip ratio using individual wheel speed ($V_{wheel}$), longitudinal estimated velocity ($V_x$), steering angle $\theta$, and yaw rate $\omega_z$ as inputs.

The slip detector component 110 can modify the measured speed for each wheel based on the following functions:

$$v_{FL} = V_{FL_{measured}} * \cos(\theta) - \frac{\omega_z L}{2}$$

$$v_{FR} = V_{FL_{measured}} * \cos(\theta) + \frac{\omega_z L}{2}$$

$$v_{RL} = V_{RL_{measured}} - \frac{\omega_z L}{2}$$

$$v_{RR} = V_{RR_{measured}} + \frac{\omega_z L}{2}$$

where L refers to the length of wheel track. The slip detector component 110 can update or determine the slip ratio of each wheel individually based on the following function:

$$\lambda = \frac{V_{wheel} - v_x}{V_{wheel}}$$

Thus, the slip detector component 110 can determine the slip ratio for each wheel 144 of the vehicle 140. The slip detector component 110 can determine that different wheels 144 have different slip ratios at the same time. For example, depending on the turning of the vehicle 140 or different on the road surfaces between the wheels 144, different wheels 144 can have different amounts of slip, resulting in different slip ratios.

The slip detector component 110 can determine a slip error for each wheel 144 of the vehicle based on the slip ratio for each wheel 144 and a target wheel slip ratio for each wheel 144. The target wheel slip ratio can be stored in the target values data structure 132 in data repository 130. The slip detector component 110 can determine the target slip ratio by accessing or querying the target values data structure 132. The slip detector component 110 can perform a lookup in the target values data structure 132 using vehicle state information or a road condition to obtain a target slip ratio for a specific state of the vehicle (e.g., highway speed, local road speed) or road condition (e.g., dry, wet, slippery, or soft). The target wheel slip ratio can be the same for all wheels of the vehicle, or vary depending on characteristics of the wheel (e.g., location, type of tire, or wheel dimensions).

In some cases, the slip detector component 110 can obtain the target wheel slip ratio from a target wheel slip generator 114. The traction control system 102 can include a target wheel slip generator 114 designed, constructed and operational to generate a target (or desired) wheel slip ratio for each wheel 144 of the vehicle. The target wheel slip generator 114 can use an offline process to generate the target wheel slip ratio. In the offline process, the target wheel slip generator 114 can use a wheel slip map 134 stored in data repository 130 to determine the target wheel slip ratio for a particular wheel 144 of the vehicle. The wheel slip map 134 can include predetermined target or desired wheel slip ratios for different vehicle driving modes, types of road conditions, vehicle states, vehicle speeds, desired torque, or other characteristics associated with the vehicle. The target wheel slip generator 114 an use an online process to generate a desired or target wheel slip ratio.

The slip detector component 110 can determine the slip error for each wheel 144 based on a difference between the desired or target slip ratio and the current determined, measured or observed slip ratio of the wheel. Based on the slip error, the traction control system 102 can determine to provide a torque compensation. If the slip error for one or more wheels 144 is greater than a threshold, then the traction control system 102 can determine to proceed with selecting a traction control technique and determining a compensation torque value for the wheel 144 having the slip error greater than (or greater than or equal to) the threshold. If the slip error for a wheel 144 is less than (or less than or equal to) the threshold, then the traction control system 102 can determine not to select a traction control technique and determine a compensation torque value for the wheel 144.

The traction control system 102 can include a controller selector component 112 designed, constructed and operational to select a traction control technique. The controller selector component 112 can receive, as input, the state of the electric vehicle 140 and the condition of the road. The controller selector component 112 can use a fuzzy-logic based control selection technique to select a traction control technique based on the state of the electric vehicle 140 and the condition of the road. For example, the state of the vehicle 140 can refer to a driving mode, such as economy mode, comfort mode, sport mode, race mode, or track mode. The road condition can indicate dry, wet, slippery, soft, rough, or muddy. Based on the vehicle state and road condition, the controller selector component 112 can select one of a least-quadratic-regulator, a sliding mode controller, a loop-shaping based controller, or a model predictive controller. The controller selector component 112 can use the same traction control technique to determine compensation torque values for one or more wheels 144 since the fuzzy logic selection technique uses inputs that may be agnostic to a particular wheel 144.

The controller selector component 112 can use the fuzzy-logic based control selection technique to adaptively switch the traction control technique during operation of the electric vehicle 140. Adaptively switching during operation of the vehicle 140 can refer to changing a traction control technique or algorithm while the vehicle is moving, driving, turned on, or otherwise operating. The controller selector component 112 can adaptively switch traction control technique without an instruction or indication from the driver to switch a traction control technique. The controller selector component 112 can adaptively switch traction control techniques without the driver changing a driving mode. For example, the driver of the vehicle 140 can set the driving mode to comfort mode (or economy mode, sport mode, race mode, track mode). The controller selector component 112 can then adaptively switch the traction control technique as the driving mode remains constant, such as in the comfort mode. The traction control system 102, therefore, can perform wheel slip control using a fuzzy-logic based selection technique to select an optimal or best traction control technique based on a vehicle state and road condition, without the driver selecting a traction control technique.

For example, the MPC 118 traction control technique can provide the fastest response relative to the LQR 120, SMC 122 and LSC 124 techniques. The MPC 118 can provide a compensation torque value within 0.1 or 0.2 seconds, and utilize the fewest computation resources. However, the MPC 118 technique may be heavily dependent on a model. Thus, the MPC 118 may not provide the most accurate or reliable compensation torque value relative to the LQR 120, SMC 122, and LSC 124 techniques. The LQR 120 technique can be configured to reduce energy consumption by the vehicle 140. The most robust technique may be LSC 124, providing the most accurate compensation torque value compared to the other techniques. However, the LSC 124 technique may be the most computation resource intensive, taking as much as 2 seconds to process the input data to generate a compensation torque value. Thus, the LSC 124 technique may be 20 times slower than the MPC 118 technique. The traction control techniques ranging from fastest, least computation resource utilization, least accurate and least reliable, to most accurate, most reliable, most computation resource intensive and slowest can be ranked as follows: 1) MPC 118, LQR 120, SMC 122 and LSC 124.

The controller selector component 112 can be configured with a fuzzy logic selection technique. For example, different controllers can have different advantages and disadvantages based on characteristics of the controllers. The controller selector component 112 can match the MPC 118, LQR 120, SMC 122, and LSC 124 based on four vehicle modes (e.g., high robust mode, robust mode, performance mode, or high performance mode), models or states as illustrated in example Table 1.

TABLE 1

Illustrative Example of Controller and Vehicle Model Map

| Controller | LSC | SMC | LQR | MPC |
|---|---|---|---|---|
| Model | High Robust mode | Robust Model | Performance Model | High Performance Model |

The controller selector component 112 can select the controller based on the tradeoff between the performance and robustness. The controller selector component 112 can receive messages or data indicating a reference slip ratio profile that contain information regarding the driving mode and confident levels of online updating accuracies of vehicle state and road surface parameters. The controller selector component 112 can use the driving mode and confident levels of online updating accuracies to select a desired controller in different conditions as illustrated in example Table 2.

TABLE 2

Illustrative Example of Driving Model to Confidence Map

| | Updating Confident Level: | | |
|---|---|---|---|
| Driving Model: | High updating Confidence | Mid updating Confidence | Low updating Confidence |
| Sport Model | High Performance Model | Performance Model | Robust Model |
| Comfort Model | Performance Model | Robust Model | High Robust Mode |
| Eco Model | Robust Model | High Robust Mode | High Robust Mode |

For example, if the vehicle is in sport mode and high a high updating confidence is desired, then the controller selector component 112 would select a high performance model (based on Table 2 mapping), which corresponds to MPC 118 based on Table 1 mapping. If the vehicle is in a comfort mode, and a high updating confidence is desired, then the controller selector component 112 can select a performance model (based on Table 2 mapping), which corresponds to LQR 120 based on the Table 1 mapping. If the vehicle is in an economy mode, and a high updating confidence is desired, then the controller selector component 112 can select a robust model (based on Table 2 mapping), which corresponds to SMC 122 based on the Table 1 mapping.

If the vehicle is in a sport mode, and a medium or mid updating confidence is desired, then the controller selector component 112 can select a performance model (based on Table 2 mapping), which corresponds to LQR 120 based on the Table 1 mapping. If the vehicle is in a comfort mode, and a medium updating confidence is desired, then the controller selector component 112 can select a robust model (based on Table 2 mapping), which corresponds to SMC 122 based on the Table 1 mapping. If the vehicle is in an economy mode, and a medium updating confidence is desired, then the controller selector component 112 can select a high robust model (based on Table 2 mapping), which corresponds to LSC 124 based on the Table 1 mapping.

If the vehicle is in a sport mode, and a low updating confidence is desired, then the controller selector component 112 can select a robust model (based on Table 2 mapping), which corresponds to SMC 122 based on the Table 1 mapping. If the vehicle is in a comfort mode, and a low updating confidence is desired, then the controller selector component 112 can select a high robust model (based on Table 2 mapping), which corresponds to LSC 124 based on the Table 1 mapping. If the vehicle is in an economy mode, and a low updating confidence is desired, then the controller selector component 112 can select a high robust model (based on Table 2 mapping), which corresponds to LSC 124 based on the Table 1 mapping.

Thus, based on the vehicle state and road condition, the controller selector component 112 selects a traction control technique using a fuzzy logic based selection logic. The controller selector component 112 can select one of MPC 118, LQR 120, SMC 122 or LSC 124 traction control techniques. The traction control system 102 can include a torque compensator component 116 designed, constructed and operational to generate a compensation torque value based on the traction control technique selected by the controller selector component 112. The torque compensator component 116 can generate, based on the traction control technique selected via the fuzzy-logic based control selection technique and the slip error for each wheel of the plurality of wheels, a compensation torque value for each wheel of the plurality of wheels. The torque compensator component 116 can use one of the MPC 118, LQR 120, SMC 122 or LSC 124 to generate the compensation torque value for each wheel 144 of the vehicle. The torque compensator component 116 can receive the estimated wheel slip ratio, the target wheel slip ratio, and the driver input torque command from the VCU 148 as inputs, process the inputs using the selected traction control technique, and output a compensated torque value for each individual drive unit 146.

In some cases, and responsive to the fuzzy-logic based selection by the controller selector component 112, the torque compensator component 116 can use MPC 118. MPC 118, or model predictive controller, can control a process while satisfying a set of constraints. The MPC 118 can use a dynamic model of the process, such as a linear empirical model. MPC 118 can differ from LQR 120 in that MPC 118 can allow a current timeslot to be optimized, while keeping future timeslots in account. The MPC 118 can achieve this by optimizing a finite time-horizon, but only implementing the current timeslot and then optimizing again, repeatedly, unlike LQR 120.

The MPC 118 model can predict the change in dependent variables of the modeled system that will be caused by changes in the independent variables. MPC 118 can be configured with an iterative, finite-horizon optimization of a model. At time t, the MPC 118 can sample the current state, and determine a cost minimizing control strategy (e.g., via a numerical minimization function) for a time horizon in the future (e.g., relatively short such as 0.1 second, 0.2 seconds. 0.5 seconds, 1 second, 2 seconds): [t, t+1]. The MPC 118 can perform an online or on-the-fly computation to identify state trajectories that emanate from the current state and determine (e.g., via a solution of Euler-Lagrange equations) a cost-minimizing control strategy until time t+T. After implementing the first step of the control strategy, the MPC 118 can sample the state again and repeat the computations from the new state, resulting in a new control and new predicted state path. Thus, the MPC 118 can keep shifting forward the prediction horizon. Although this approach may not provide optimal compensation torque values relative to LQR 120, SMC 122 and LSC 124, it may utilize the fewest computation resources and take the least amount of time to provide a compensation torque value.

The MPC 118 can be configured to minimize the difference between reference and actual wheel slip ratio while keeping the control inputs are relatively small. After calibrating and tuning, the MPC 118 can use a reasonable receding horizon length (T) for calculating optimal control inputs in each iteration. For each time step (t), the states of wheel dynamics can be updated with estimated and measured data. Based on updated states and the dynamic model of the wheel slip, the MPC 118 can predict the future states of wheel dynamics and perform an optimization over finite horizon t to T using the following cost function:

$$J_N = \Sigma_{k=1}^{N} (\lambda(k) - \lambda_{ref}(k))^T Q(k)(\lambda(k) - \lambda_{ref}(k)) + u(k)^T R(k) u(k)$$

Where u is the control input $T_m$, N is the number of moving horizons which is equal to $$\frac{T}{\Delta t}.$$

The MPC 118 can use the following constraints of states and inputs during optimization:

$$\lambda \leq \lambda_{max}$$

$$T_{m_{min}} \leq u \leq T_{m_{max}}$$

$$\Delta T_{m_{min}} \leq \Delta u \leq \Delta T_{m_{max}}$$

After optimization, the MPC 118 can obtain a series of optimal control input $T_m$ from t to T. The MPC 118 can, in some cases, apply only the first control command, u(1), from optimization at time t.

In some cases, and responsive to the fuzzy-logic based selection by the controller selector component 112, the torque compensator component 116 can use LQR 120, or least-quadratic regulator or linear-quadratic regulator. The LQR 120 can include a feedback controller.

The LQR 120 can be configured with the following function to dynamically determine wheel slip:

$$\lambda = \frac{V_{wheel} - v_x}{V_{wheel}} = \frac{r\omega - v_x}{r\omega}$$

By derivation, $$\dot{\lambda} = \frac{(r\dot{\omega} - \dot{v}_x)r\omega - (r\omega - v_x)r\dot{\omega}}{r^2 \omega^2}$$

For $\dot{\omega}$, $$\dot{\omega} = \frac{T_m - T_d}{I_\omega}$$

Thus, the LQR 120 can use the following function to determine the wheel slip dynamics:

$$\dot{\lambda} = \frac{a_x}{V_x} * \lambda + \frac{V_x}{I_\omega r\omega^2} * T_m - \left(\frac{a_x}{V_x} + \frac{V_x}{I_\omega r\omega^2} rF_d\right)$$

Where the $\lambda$ is the slip ratio, $a_x$ is longitudinal acceleration, $V_x$ is longitudinal velocity, $I_\omega$ is the wheel moment of inertia, r is the wheel radius, $T_m$ is the driving input torque, and $F_d$ is the longitudinal tire-road contact force.

The nonlinear term $$\frac{a_x}{V_x} + \frac{V_x}{I_\omega r\omega^2} rF_d$$

and steady state error introduced by the states-feedback are cancelled by using a feedforward controller. The remaining pair can be represented with the following function:

$$\dot{\lambda} = A\lambda + BT_m$$

Where A is equal to $$\frac{a_x}{V_x},$$

and B is equal to $$\frac{V_x}{I_\omega r\omega^2}.$$

If $e = \lambda - \lambda_{ref}$ and $\delta_u = T_m - T_{m_{ref}}$, then, wheel slip dynamic function can be transferred in the error reference frame, as follows:

$$\dot{e}(t) = Ae(t) + B\delta_u$$

After discretization, the function can be:

$$e(k+1) = A_d e(k) + B\delta_u(k)$$

Then, via linear quadratic optimal control (LQR), the LQR 120 can use the following cost function:

$$J_N = \Sigma_{k_0}^\infty e(k)^T Q(k) e(k) + \delta_u(k)^T R(k) \delta_u(k)$$

Where the Q(k) is positive semidefinite, and R(k) is positive definite.

The LQR 120 can obtain an optimal feedback gain K using Riccati function as follows:

$$A^T PA - P - A^T PB[R + B^T PB]^{-1} B^T PA + C^T C = 0$$

$$K = [R + B^T PB]^{-1} B^T P$$

In some cases, and responsive to the fuzzy-logic based selection by the controller selector component 112, the torque compensator component 116 can use SMC 122, or a sliding mode controller. The SMC 122 can determine wheel slip dynamics using the following function:

$$\dot{\lambda} = \frac{a_x}{V_x} * \lambda + \frac{V_x}{I_\omega r\omega^2} * T_m - \left(\frac{a_x}{V_x} + \frac{V_x}{I_\omega r\omega^2} rF_d\right)$$

This function can be simplified as follows:

$$\dot{\lambda} = -\frac{\dot{v}_x}{r\omega} + \frac{v_x}{I_\omega r\omega^2}(T_m - T_d)$$

The SMC 122 can determine the control input $T_m$ using the following function:

$$T_m = T_d + \frac{I_\omega \omega \dot{v}_x}{v_x} + \frac{I_\omega r\omega^2}{v_x}\lambda$$

The SMC 122 can determine the sliding surface S(t) with the following function:

$$S = \lambda - \lambda_{ref}$$

The SMC 122, in order to make the control performance achievable, use a reaching condition as follows:

$$\dot{S} = -k_1(\lambda - \lambda_{ref}) - k_2(\dot{\lambda} - \dot{\lambda}_{ref}) - k_3(\ddot{\lambda} - \ddot{\lambda}_{ref})^2 \cdot \text{sgn}(\lambda - \lambda_{ref}) - k_s \cdot \text{sgn}(\lambda - \lambda_{ref})$$

$$\dot{S} = \dot{\lambda} - \dot{\lambda}_{ref} = -k_1(\lambda - \lambda_{ref}) - k_2(\dot{\lambda} - \dot{\lambda}_{ref}) - k_3(\ddot{\lambda} - \ddot{\lambda}_{ref})^2 \cdot \text{sgn}(\lambda - \lambda_{ref}) - k_s \cdot \text{sgn}(\lambda - \lambda_{ref})$$

$$\dot{\lambda} = \dot{\lambda}_{ref} - k_1(\lambda - \lambda_{ref}) - k_2(\dot{\lambda} - \dot{\lambda}_{ref}) - k_3(\ddot{\lambda} - \ddot{\lambda}_{ref})^2 \cdot \text{sgn}(\lambda - \lambda_{ref}) - k_s \cdot \text{sgn}(\lambda - \lambda_{ref})$$

After plugging above equation into the wheel slip dynamics equation, the SMC 122 can determine the control input as follows:

$$T_m = rF_d + \frac{I_\omega \omega \dot{v}_x}{v_x} + \frac{I_\omega r\omega^2}{v_x}[\dot{\lambda}_{ref} - k_1(\lambda - \lambda_{ref}) - k_2(\dot{\lambda} - \dot{\lambda}_{ref}) - k_3(\ddot{\lambda} - \ddot{\lambda}_{ref})^2 \cdot \text{sgn}(\lambda - \lambda_{ref}) - k_s \cdot \text{sgn}(\lambda - \lambda_{ref})]$$

Since the SMC 122 can be sensitive to the model uncertainties and disturbances, the SMC 122 can be configured with an additional proportional-integral-derivative ("PID") controller with high gain to reduce the reaching time to sliding surface and tracking error.

In some cases, and responsive to the fuzzy-logic based selection by the controller selector component 112, the torque compensator component 116 can use LSC 124, or a loop-shaping based controller. The LSC 124 can include or use an H-infinity type controller. Through combing different controllers, the loop-shaping method provides good robustness for noise and disturbance rejection and model uncertainty handling. The LSC 124 can be configured with or use an open-loop transfer function of the wheel slip control system to meet performance and robustness specifications. The LSC 124 can shape the loop gain L(s)=C(s)P(s) by selecting compensator as a product of different controllers such as low-frequency boost, integral boost, roll-off, lead and lag. By considering the control system requirements, the LSC 124 can determine L(s). For example, the bandwidth of the control system can be selected based on hardware actuation speed. Then, with the given transfer function of the plant P(s), the transfer function C(s) can be obtained. A pole of close loop is placed at the origin for zero steady-state error. The gain can be adjusted to maintain a relative high value at the mid-frequency range for disturbance attenuation. A high-frequency roll-off can be added to the compensator for handling high frequency noises. In the same time, the phase margin and gain margin can be adjusted by using lead and lag controllers for ensuring the stability and minimizing the settling time. Thus, the LSC 124 can provide a robust controller for noise and disturbance rejection.

The traction control system 102 can include a command generator component 126 designed, constructed and operational to generate one or more commands corresponding to the compensation torque value for each drive unit 146 of each wheel 144 of the vehicle 140 to control traction. The command generator component 126 can receive the compensation torque value from the torque compensator component 116 along with an indication of the drive unit 146. Each drive unit 146 can be associated with an identifier, such as a numerical identifier, alphanumeric identifier, string, character or other identifier. The command generator component 126 can generate a command that instructs or causes the drive unit 146 to actuate in order to facilitate traction controller. The command can be an electronic signal or data packet with instructions. The command can be in any format and contain any data that facilitates actuating the drive unit 146 responsive to the compensation torque value.

Thus, the torque compensator component 116 can use a traction control technique to determine a compensation torque value based on the slip error. The traction control system 102 can include a moment regulator component 128 designed, constructed and operational to regulate vertical moment of the electric vehicle 140 based on a difference of individual motor torque caused by the compensation torque value for each wheel 144 of the vehicle 140. The torque compensator component 116 can determine a torque compensation value to be applied for each wheel 144 of the vehicle 140, which may result in a different torque for each wheel 144 of the vehicle 140. The moment regulator component 128 can post-process the compensation torque values for the individual drive units 146 based on a rule or logic, the vehicle state and the road condition to modify or adjust the compensation torque command. The moment regulator component 128 can improve safety by regulating the vertical moment that can result from differences in individual torques delivered to the individual drive units 146. Thus, the moment regulator component 128 can regulate vertical moment of the electric vehicle 140 based on a difference of individual motor torques caused by the compensation torque value for each wheel 144 of the vehicle 140.

For example, the moment regulator component 128 can receive the torque commands for each individual drive unit 146 from the command generator component 126. The moment regulator component can receive the compensation torque value for each wheel 144 of the vehicle 140, and generate one or more commands based on a heuristic technique applied to the compensation torque value for each wheel 144, the state of the electric vehicle, and the condition of the road.

Because four different motors (e.g., drive units 146) can update and calculate wheel status and compensated torques individually, to avoid an undesired yaw momentum, the moment regulator component 128 can keep the torque difference between left and right side of the vehicle 140 within a designed threshold.

The moment regulator 128 can check the updated torques for each of the four different drive units 146 as follows:

If$((T_{FL}-T_{FR})>\text{threshold}_{Front})$ $T_{FL}=T_{FR}+\text{threshold}_{Front}$;

else if $((T_{FR}-T_{FL})>\text{threshold}_{Front})$ $T_{FR}=T_{FL}+\text{threshold}_{Front}$;

If$((T_{RL}-T_{RR})>\text{threshold}_{rear})$ $T_{RL}=T_{RR}+\text{threshold}_{rear}$;

else if $((T_{RR}-T_{RL})>\text{threshold}_{rear})$ $T_{RR}=T_{RL}+\text{threshold}_{rear}$;

Where $T_{FL}$, $T_{FR}$, $T_{RL}$, and $T_{RR}$ are compensated torques corresponding to the front left wheel 144, front right wheel 144, rear left wheel 144, and rear right wheel 144. The moment regulator component 128 can determine the thresholds based on calibrations and tuning, taking into account vehicle dynamics including loading weight and speed.

The traction control system 102 can provide the compensation torque command to the drive unit 146 of the vehicle 140. The traction control system 102 can provide a separate torque command to each drive unit 146 of the vehicle 140. The traction control system 102 can provide the compensated torque value that has been post-processed by the moment regulator component 128. The traction control system 102 can transmit one or more commands corresponding to the compensation torque value for each wheel to each drive unit 146 of the vehicle 140. The traction control system 102 can actuate the one or more drive units 146 based on the one or more commands.

For example, the vehicle 140 can include four wheels 144. The vehicle 140 can include four drive units 146, one drive unit 146 for each of the four wheels 144. 6. The drive unit 146 can be configured to drive a corresponding wheel 144 based on the one or more commands. for example, a first drive unit 146 can be coupled to a first wheel 144, a second drive unit 146 can be coupled to a second wheel 144, a third drive unit 146 can be coupled to a third wheel 144, and a fourth drive unit 146 can be coupled to a fourth wheel 144. The traction control system 102 can generate, based on a selected traction control technique, individual slip error, individual target slip error, vehicle state, and road condition, a first compensation torque value for the first wheel 144, a second compensation torque value for the second wheel 144, a third compensation torque value for the third wheel 144, a fourth compensation torque value for the fourth wheel 144. The traction control system 102 can generate a first command for the first wheel 144 based on the first compensation torque value, and transmit the first command to the first drive unit 146 to cause the first drive unit 146 to control torque of the first wheel 144. The traction control system 102 can generate a second command for the second wheel 144 based on the second compensation torque value, and transmit the second command to the second drive unit 146 to cause the second drive unit 146 to control torque of the second wheel 144. The traction control system 102 can generate a third command for the third wheel 144 based on the third compensation torque value, and transmit the third command to the third drive unit 146 to cause the third drive unit 146 to control torque of the third wheel 144. The traction control system 102 can generate a fourth command for the fourth wheel 144 based on the fourth compensation torque value, and transmit the fourth command to the fourth drive unit 146 to cause the fourth drive unit 146 to control torque of the fourth wheel 144.

Figure 2:
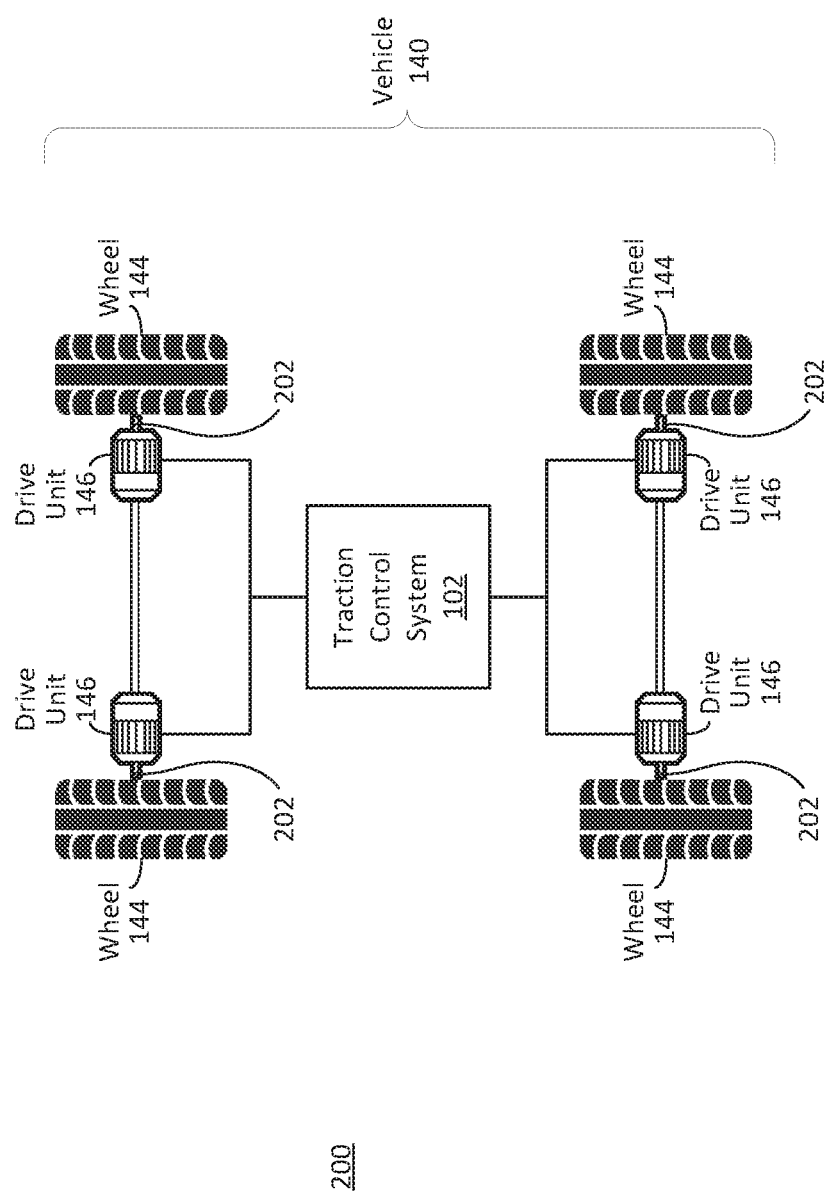
FIG. 2 depicts an illustration of a system to control traction of an electric vehicle, in accordance with an implementation.

FIG. 2 depicts an illustration of a system to control traction of an electric vehicle, in accordance with an implementation. The system 200 can include one or more system or component depicted in FIG. 1 and FIG. 6. The system 200 can include a vehicle 140. The vehicle 140 can include a traction control system 102. The traction control system 102 can be communicatively coupled to a drive unit 146. The drive unit 146 can drive or rotate an axel 202 that is coupled to the wheel 144. The axel 202 can rotate the wheel 144. The vehicle 140 can include four wheels 144 and four drive units 146. The traction control system 102 can individually drive each of the drive units 146 in order to provide individual wheel slip control for each wheel 144.

Figure 3:
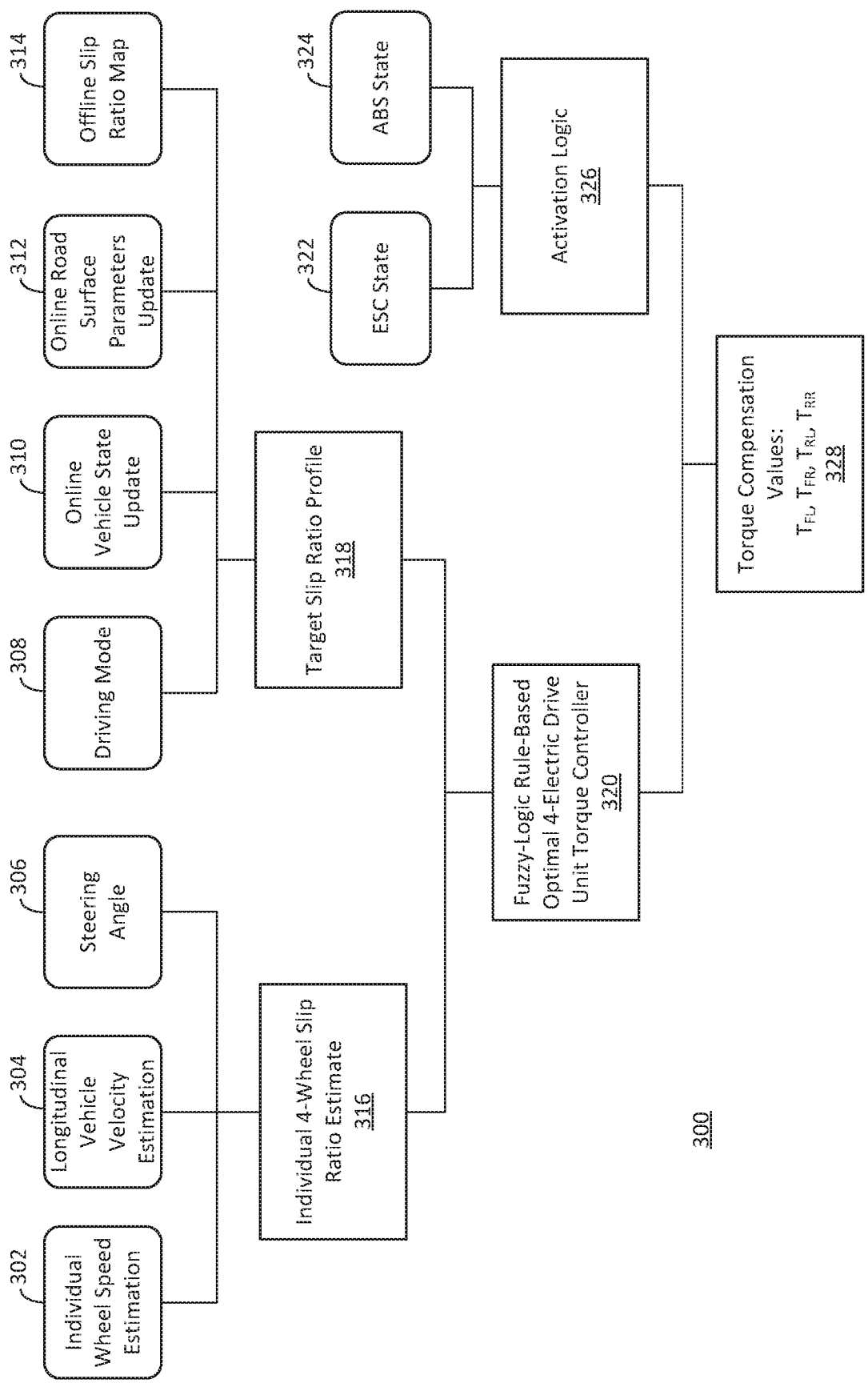
FIG. 3 depicts a flow diagram of an example process of controlling traction of an electric vehicle, in accordance with an implementation.

FIG. 3 depicts a flow diagram of an example process of controlling traction of an electric vehicle, in accordance with an implementation. The process 300 can be performed by one or more system or component depicted in FIG. 1, FIG. 2, or FIG. 6, including, for example, a traction control system. At ACT 304, the traction control system can receive an individual wheel speed estimate. The traction control system can receive or determine the wheel speed estimate for each wheel of the vehicle. The wheel speed estimate can be in any units, including, for example, rotations per minute, rotations per second, rotations per hour, miles per hour, or kilometers per hour. The traction control system can receive the wheel speed estimate for each wheel from a sensor.

At ACT 304, the traction control system can receive a longitudinal vehicle velocity estimate. The traction control system can receive or determine the longitudinal vehicle velocity estimate using one or more sensors of the vehicle. The traction control system can perform processing to determine the longitudinal velocity estimate. At ACT 306, the traction control system can receive or identify a steering angle from a steering sensor. The traction control system can receive the wheel speed estimation, vehicle velocity, and steering angle for a same time stamp or same time interval (e.g., within 0.1 second, 0.005 second, 0.2 second, 0.5 seconds, 1 second or other time interval that facilitates performing wheel slip control or traction control).

At ACT 316, the traction control system can determine an individual wheel slip ratio for each wheel of the vehicle. The traction control system can determine the individual wheel slip ratio for each wheel based on the wheel speed estimate received at ACT 302, the vehicle velocity received at ACT 304, and the steering angle received at ACT 306.

At ACT 308, the traction control system can determine a driving mode of the vehicle. The driving mode can refer to or include sport mode, race mode, track mode, comfort mode, or economy mode. The driving mode can refer to or include all-wheel drive, four wheel drive, rear wheel drive, or front wheel drive. The traction control system can receive the driving mode information from a vehicle control unit, or other component of the vehicle.

At ACT 310, the traction control system can identify an online vehicle state update. The online vehicle state can refer to, for example, desired confidence level for an update, such as high confidence, medium confidence, or low confidence as indicated in Table 2. The vehicle mode can refer to sport mode, comfort mode, or economy mode.

At ACT 312, the traction control system can determine road surface parameters. The traction control system can determine the road surface parameters in an online manner, such as during operation of the vehicle. The traction control system can determine the road surface parameters using various techniques. In some cases, a driver of the vehicle can input a road surface condition, such as dry, wet, slippery, or soft. In some cases, the traction control system can determine the road surface conditions using sensors. The traction control system can determine road surface conditions based on weather conditions obtained from an online resource. The traction control system can determine road conditions based on a location of the vehicle and performing a lookup a database of road conditions. The traction control system can fuse data from multiple sensors to determine the road condition.

At ACT 314, the traction control system can retrieve or access an offline slip ratio map. The offline slip ratio map can include a mapping of target or desired slip ratios based on driving mode, vehicle state, and road surface parameters. The slip ratio map can be stored in memory of the vehicle, or retrieved from an online resource. The traction control system can update the map stored in memory based on a periodic basis.

At ACT 318, the traction control system can determine a target slip ratio. The traction control system can determine the target slip ratio based on the driving mode identified at ACT 308, the vehicle state identified at ACT 310, the road surface parameters identified at ACT 312, and the slip ratio map retrieved at ACT 314. The traction control system can map the input values to a corresponding slip ratio.

At ACT 320, the traction control system can execute a fuzzy-logic rule-based optimal 4-electric drive unit torque controller. The traction control system can select an optimal traction control technique (e.g., one of MPC, LQR, SMC, or LSC) based on the vehicle state or driving mode and the road condition. Using the selected traction control technique, the traction control system can determine a compensation torque value to provide wheel slip control based on the slip ratio estimate from ACT 316 and the target slip ratio from ACT 318. The traction control system can determine an individual compensation torque value for each drive unit.

At ACT 326, the traction control system can execute activation logic. The traction control system can determine whether to actuate the drive units of the vehicle based on the compensation torque values. The traction control system can determine, at ACT 322, whether the ESC is active or inactive. At ACT 324, the traction control system can determine whether the ABS is active or inactive. At ACT 326, the traction control system can determine whether to activate wheel slip control based on the states of the ESC and ABS. If at least one of the ESC or ABS is active, then the traction control system can determine to deactivate wheel slip control (or prevent or block the compensation torque values from being transmitted to the drive units). However, if both the ESC and ABS are inactive, the traction control system can determine to transmit the compensation torque values to the drive units.

At ACT 328, the traction control system can transmit the compensation torque values for the front-left drive unit ("$T_{FL}$"), front-right drive unit ("$T_{FR}$"), rear-left drive unit ("$T_{RL}$"), and rear-right drive unit ("$T_{RR}$"). The drive units, responsive to receiving the command, can actuate the drive unit to control wheel slip.

Figure 4:
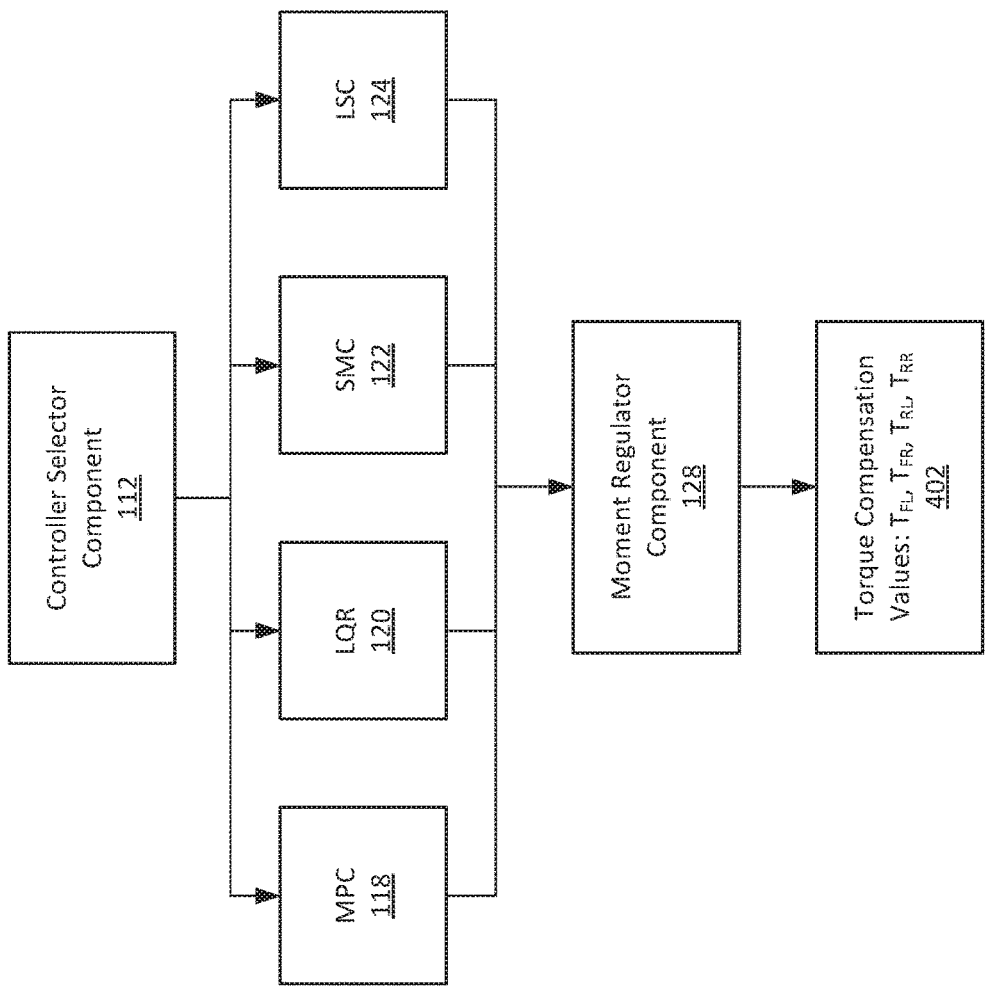
FIG. 4 depicts an example operation of a system to control traction of an electric vehicle, in accordance with an implementation.

FIG. 4 depicts an example operation of a system to control traction of an electric vehicle, in accordance with an implementation. The operation 400 can be performed by one or more system or component depicted in FIG. 1, FIG. 2 or FIG. 6, including, for example, a traction control system 102. During operation 400, the controller selector component 112 can select a traction control technique using a fuzzy-logic rule-based selection technique. The controller selector component 112 can select one of MPC 118, LQR 120, SMC 122 or LSC 124 to use to determine the compensation torque value for a given time interval or sample. The controller selector component 112 can adaptively switch between different traction control techniques for different time intervals or samples.

The moment regulator component 128 can receive an individual compensation torque value for each wheel of the vehicle that is determined using one of MPC 118, LQR 120, SMC 122 or LSC 124. The moment regulator component 128 can receive four compensation torque values. Since each of the torque values may be different, the moment regulator component 128 can evaluate each of the torque values to regulate vertical moment. The moment regulator component 128 can adjust, modify or otherwise manipulate one or more of the torque values based on a post-processing technique to regulate vertical moment. The moment regulator component 128 can generate one or more new torque values. For example, the moment regulator component 128 may modify the compensation torque values for one or more of the drive units, but not all of the drive units. At 402, the moment regulator component 128 can provide the final, moment regulated, torque compensation values $T_{FL}$, $T_{FR}$, $T_{RL}$, and $T_{RR}$ to the drive units after post-processing. The drive units can actuate responsive to the torque values.

Figure 5:
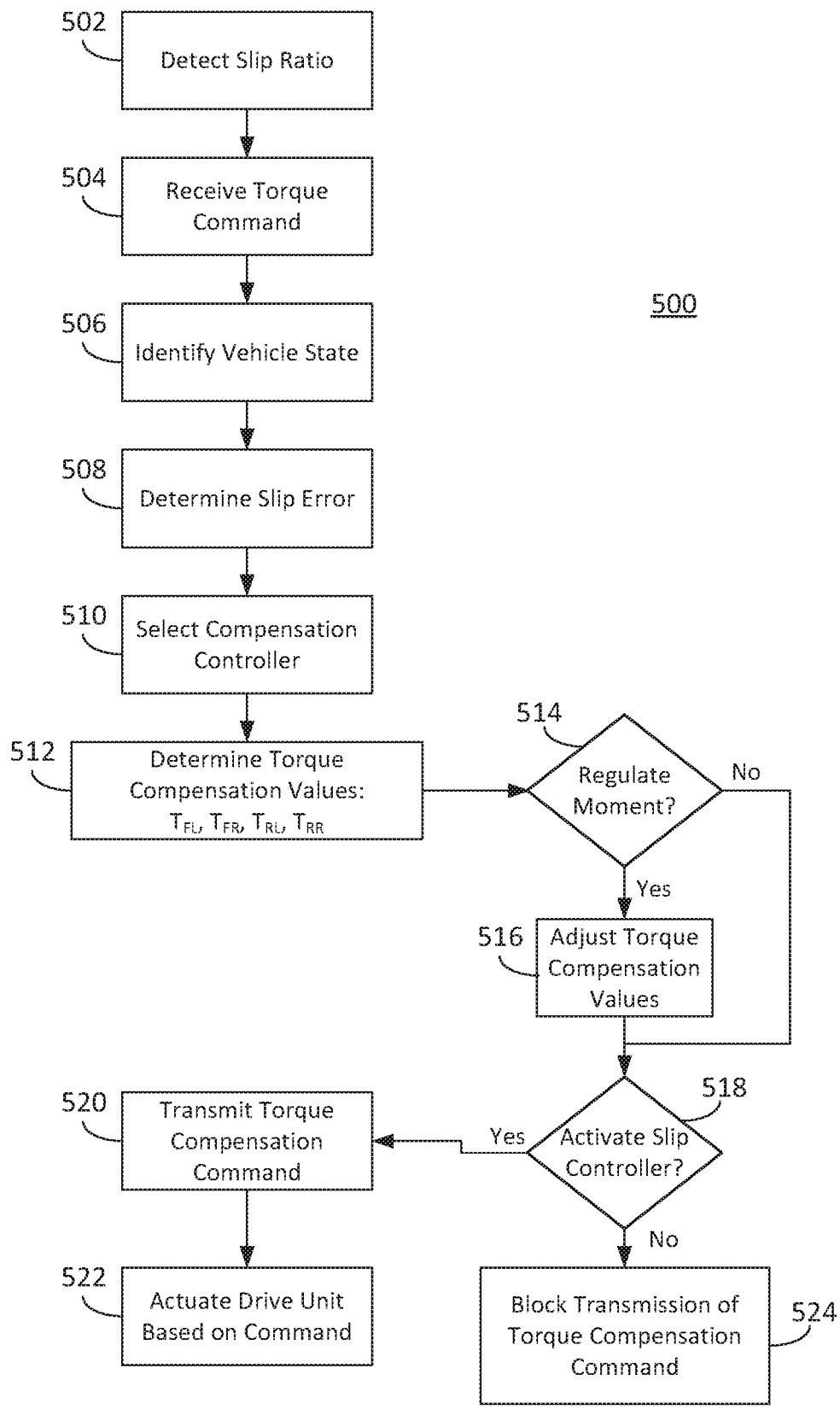
FIG. 5 depicts a flow diagram depicting an example method of controlling traction of an electric vehicle, in accordance with an implementation.

FIG. 5 depicts a flow diagram depicting an example method of controlling traction of an electric vehicle, in accordance with an implementation. The method 500 can be performed by one or more system or component depicted in FIG. 1, FIG. 2 or FIG. 6, including, for example, a traction control system and vehicle. At ACT 502, the traction control system can detect a slip ratio. The traction control system can receive the slip ratio from a VCU of the vehicle. The traction control system can determine or compute the slip ratio based on sensor data received from one or more sensors of the vehicle. The traction control system can determine the wheel slip ratio for each wheel of a vehicle (e.g., an individual wheel slip ratio).

At ACT 504, the traction control system can receive a torque command. The traction control system can receive the torque command from a VCU of the vehicle. The torque command can refer to a driver input torque command that corresponds to the driver pressing the accelerator of the vehicle. The vehicle can generate the torque command independent of driver input based on an adaptive cruise control functionality, or other autonomous driving functionality.

At ACT 506, the traction control can identify a vehicle state and road condition. The traction control system can determine the vehicle state from a VCU of the vehicle or other component of the vehicle. The vehicle state can refer to or include a driving mode, such as sport, race, track, comfort, or economy. The vehicle state can refer to or include a speed at which the vehicle is driving, such as slow, medium or fast or a specific miles per hour or kilometers per hour. The vehicle state can refer to or include which functions of the vehicle are active, such as cruise control, adaptive cruise control, autonomy mode, ABS, ESC, all-wheel drive, four wheel drive, rear wheel drive or front wheel drive, towing, or weight of the vehicle. The road condition can refer to or include road surface parameters or conditions, such as dry, wet, soft, slippery, rough, smooth, muddy, terrain information, incline, or decline.

At ACT 508, the traction control system can determine a slip error. The traction control system can determine the slip error for each wheel of the vehicle. The traction control system can determine a target slip ratio based on a driving mode, vehicle state, road surface parameters or condition, and a slip ratio map. Based on the target slip ratio and the current slip ratio for each wheel, the traction control system can determine the slip error. The slip error can be the difference between the target slip ratio and slip ratio estimate for a wheel. The traction control system can determine the slip error for each wheel of the vehicle, as each wheel of the vehicle may have a different slip ratio.

At 510, the traction control system can select a compensation controller. The traction control system can input the state of the vehicle and the condition of the road into a fuzzy-logic based control selection technique to select a traction control technique. The traction control technique can include one of a least-quadratic-regulator, a sliding mode controller, a loop-shaping based controller, or a model predictive controller. The traction control system can adaptively switch between traction control techniques based on the vehicle state and road condition information for a particular moment during operation of the vehicle.

At ACT 512, the traction control system can determine torque compensation values for each wheel or drive unit of the vehicle based on the selected traction control technique. For example, the traction control system can determine compensation torque values $T_{FL}$, $T_{FR}$, $T_{RL}$, and $T_{RR}$ corresponding to the wheels of the vehicle.

At decision block 514, the traction control system can determine whether to protect or regulate the vertical moment. Since values $T_{FL}$, $T_{FR}$, $T_{RL}$, and $T_{RR}$ corresponding to the wheels of the vehicle may each be different, the traction control system can improve safety by regulating vertical moment. The traction control system can evaluate each of the values $T_{FL}$, $T_{FR}$, $T_{RL}$, and $T_{RR}$ to determine whether to regulate the moment. The traction control system can determine a vertical moment that results from the values $T_{FL}$, $T_{FR}$, $T_{RL}$, and $T_{RR}$. The traction control system can compare the vertical moment with a threshold to determine whether the adjust the compensation torque values. The threshold can be a fixed value, predetermined value or dynamic threshold. The traction control system can determine or select the threshold based on vehicle state information, road condition or other information. If the traction control system determines to regulate the vertical moment, the traction control system can proceed to ACT 516 to adjust the torque compensation values $T_{FL}$, $T_{FR}$, $T_{RL}$, and $T_{RR}$.

If the traction control system determines not to regulate vertical moment at decision bock 514, then the traction control system can proceed to decision block 518 to determine whether the activate the slip controller. The traction control system can proceed to decision block 518 upon adjusting the torque compensation values at ACT 516. At decision block 518, the traction control system can determine whether to activate the wheel slip controller based on whether the vehicle brakes are active and in-use, whether the ABS is in-use, or whether the ESC is in-use. If any one of the brakes, the ABS or ESC are active and in-use at the moment, then the traction controller component can determine to not active the wheel slip controller and proceed to ACT 524, where the traction control system blocks, prevents or otherwise does not transmit the torque compensation values or corresponding commands generate by the traction control system to the drive units.

However, if the traction control system determines, at decision block 518, to activate the wheel slip controller (e.g., if none of the brakes, ABS or ESC are active), then the traction control system can proceed to ACT 520. At ACT 520, the traction control system can transmit torque compensation commands corresponding to the compensated torque values to each of the drive units of the vehicle. The traction control system can transmit the commands via an electrical wire, or other communication means to the individual drive units. At ACT 522, the traction control system can actuate the drive unit based on the torque compensation commands. The traction control system can actuate each individual drive unit based on an individual torque compensation command for the drive unit in order to control traction and reduce the wheel slip error.

Figure 6:
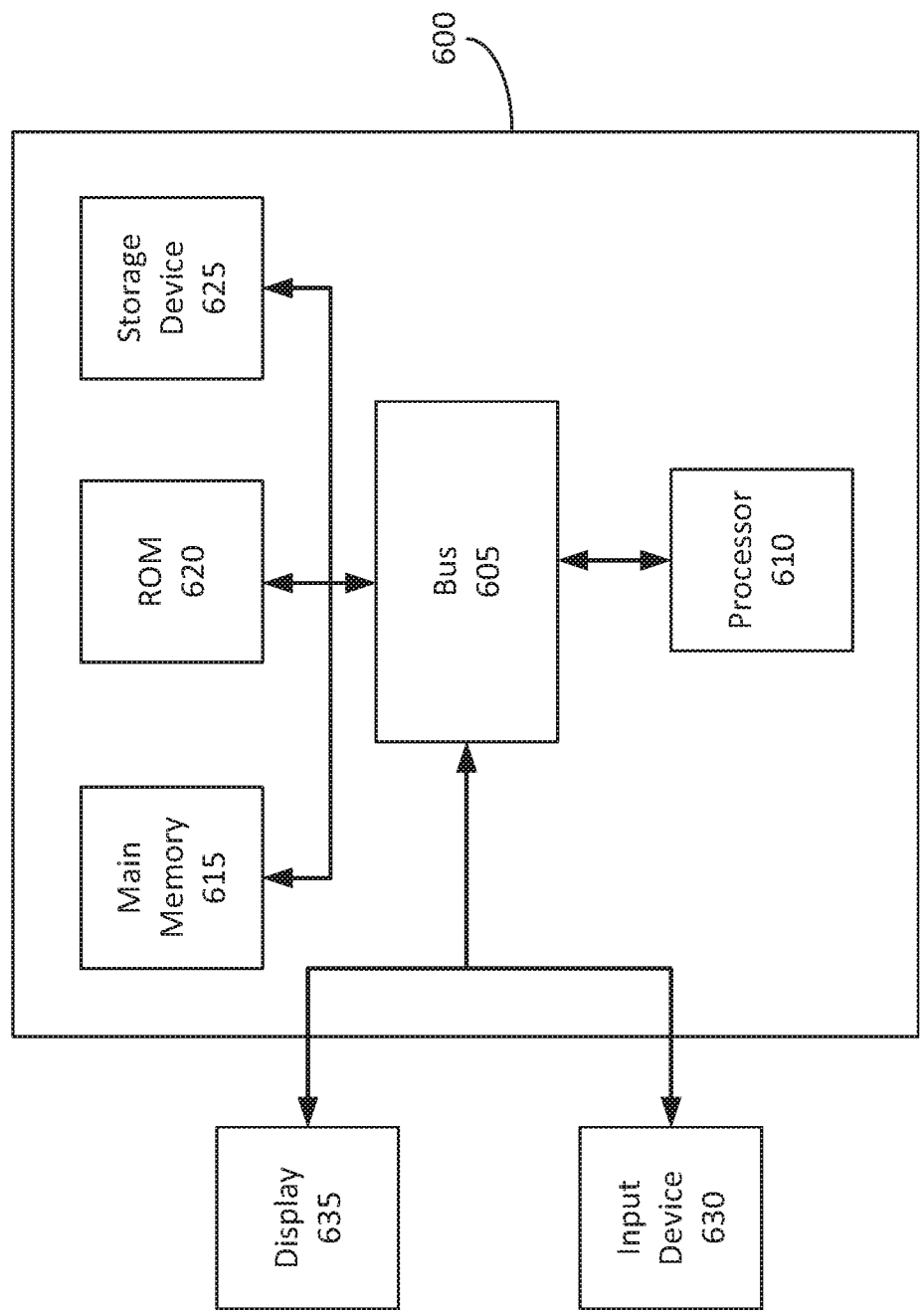
FIG. 6 is a block diagram illustrating an architecture for a computer system that can be employed to implement elements of the systems, operations, processes and methods described and illustrated herein, including, for example, in FIGS. 1-5.

FIG. 6 is a block diagram of an example computer system 600. The computer system or computing device 600 can include or be used to implement the traction control system 102, or its components such as the traction control system 102. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be or include the memory. The main memory 615 can also be used for storing target values, functions, maps, rules, thresholds, models, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repository 130.

The computing system 600 may be coupled via the bus 605 to a display 635, such as a liquid crystal display, or active matrix display, for displaying information to a user such as a driver of the vehicle 140. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can be part of the traction control system 102, or other component of FIG. 1, as well as part of the vehicle external to the traction control system 102, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., torque compensator component 116, controller selector component 112, moment regulator component 128) and operations 300, 400 or 500 depicts grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to control traction of an electric vehicle, comprising:
   a traction control system comprising one or more processors and memory to:
   identify a state of the electric vehicle and a condition of a road in contact with one or more of a plurality of wheels of the electric vehicle;
   detect a wheel slip ratio for each wheel of the plurality of wheels of the electric vehicle;
   receive, from a vehicle control unit of the electric vehicle, an input torque command;
   determine a slip error for each wheel of the plurality of wheels based on the wheel slip ratio for each wheel of the plurality of wheels and a target wheel slip ratio for each wheel of the plurality of wheels;
   input the state of the electric vehicle and the condition of the road into a fuzzy-logic based control selection technique to select a traction control technique comprising one of a least-quadratic-regulator, a sliding mode controller, a loop-shaping based controller, and a model predictive controller;
   generate, based on the traction control technique selected via the fuzzy-logic based control selection technique and the slip error for each wheel of the plurality of wheels, a compensation torque value for each wheel of the plurality of wheels;
   transmit one or more commands corresponding to the compensation torque value for each wheel of the plurality of wheels to one or more drive units of the plurality of wheels of the electric vehicle to control traction for the electric vehicle; and
   regulate vertical moment of the electric vehicle based on a difference of individual motor torque caused by the compensation torque value for each wheel of the plurality of wheels.

2. The system of claim 1, wherein the traction control system is configured to use the fuzzy-logic based control selection technique to adaptively switch the traction control technique during operation of the electric vehicle.

3. The system of claim 1, comprising a moment protector executed by the traction control system to:
   receive the compensation torque value for each wheel of the plurality of wheels; and
   generate the one or more commands based on a heuristic technique applied to the compensation torque value for each wheel of the plurality of wheels, the state of the electric vehicle, and the condition of the road.

4. The system of claim 1, comprising the traction control system to:
   actuate the one or more drive units of the plurality of wheels based on the one or more commands.

5. The system of claim 1, wherein the plurality of wheels comprise four wheels, and the electric vehicle comprises four drive units, each of the four drive units configured to drive a corresponding wheel of the plurality of wheels based on the one or more commands.

6. The system of claim 1, wherein:
   the plurality of wheels comprise a first wheel, a second wheel, a third wheel, and a fourth wheel;
   the one or more drive units comprise a first drive unit coupled to the first wheel, a second drive unit coupled to the second wheel, a third drive unit coupled to the third wheel, and a fourth drive unit coupled to the fourth wheel;
   the compensation torque value for each wheel of the plurality of wheels comprises a first compensation torque value for the first wheel, a second compensation torque value for the second wheel, a third compensation torque value for the third wheel, a fourth compensation torque value for the fourth wheel; and
   the traction control system is further configured to:
      generate a first command for the first wheel based on the first compensation torque value, and transmit the first command to the first drive unit to cause the first drive unit to control torque of the first wheel;
      generate a second command for the second wheel based on the second compensation torque value, and transmit the second command to the second drive unit to cause the second drive unit to control torque of the second wheel;
      generate a third command for the third wheel based on the third compensation torque value, and transmit the third command to the third drive unit to cause the third drive unit to control torque of the third wheel; and
      generate a fourth command for the fourth wheel based on the fourth compensation torque value, and transmit the fourth command to the fourth drive unit to cause the fourth drive unit to control torque of the fourth wheel.

7. The system of claim 1, comprising the traction control system to:
   determine to deactivate a wheel slip control technique based on the state of the electric vehicle; and
   block, responsive to deactivation of the wheel slip control technique, transmission of the one or more commands based on the compensation torque value.

8. The system of claim 1, comprising the traction control system to:

detect that at least one of a brake of the electric vehicle, an electronic stability control program of the electric vehicle, or an anti-lock braking system of the electric vehicle is active; and block, responsive to the detection, generation of the compensation torque value for each wheel of the plurality of wheels or transmission of the one or more commands corresponding to the compensation torque value for each wheel of the plurality of wheels to the one or more drive units of the plurality of wheels of the electric vehicle to control traction for the electric vehicle.

9. A method of controlling traction of an electric vehicle, comprising:

detecting, by a traction control system comprising one or more processors and memory, a wheel slip ratio for each wheel of a plurality of wheels of the electric vehicle;

receiving, by the traction control system from a vehicle control unit of the electric vehicle, an input torque command;

identifying, by the traction control system, a state of the electric vehicle and a condition of a road in contact with one or more of the plurality of wheels of the electric vehicle;

determining, by the traction control system, a slip error for each wheel of the plurality of wheels based on the wheel slip ratio for each wheel of the plurality of wheels and a target wheel slip ratio for each wheel of the plurality of wheels;

inputting, by the traction control system, the state of the electric vehicle and the condition of the road into a fuzzy-logic based control selection technique to select a traction control technique comprising one of a least-quadratic-regulator, a sliding mode controller, a loop-shaping based controller, or a model predictive controller;

generating, by the traction control system, based on the traction control technique selected via the fuzzy-logic based control selection technique and the slip error for each wheel of the plurality of wheels, a compensation torque value for each wheel of the plurality of wheels;

transmitting, by the traction control system, one or more commands corresponding to the compensation torque value for each wheel of the plurality of wheels to one or more drive units of the plurality of wheels of the electric vehicle to control traction for the electric vehicle; and regulating vertical moment of the electric vehicle based on a difference of individual motor torque caused by the compensation torque value for each wheel of the plurality of wheels.

10. The method of claim 9, comprising:
adaptively switching, based the fuzzy-logic based control selection technique, the traction control technique during operation of the electric vehicle.

11. The method of claim 9, comprising:
receiving the compensation torque value for each wheel of the plurality of wheels; and
generating the one or more commands based on a heuristic technique applied to the compensation torque value for each wheel of the plurality of wheels, the state of the electric vehicle, and the condition of the road.

12. The method of claim 9, comprising:
actuating the one or more drive units of the plurality of wheels based on the one or more commands.

13. The method of claim 9, wherein the plurality of wheels comprise four wheels, and the electric vehicle comprises four drive units, each of the four drive units configured to drive a corresponding wheel of the plurality of wheels based on the one or more commands.

14. The method of claim 9, wherein:
the plurality of wheels comprise a first wheel, a second wheel, a third wheel, and a fourth wheel;
the one or more drive units comprise a first drive unit coupled to the first wheel, a second drive unit coupled to the second wheel, a third drive unit coupled to the third wheel, and a fourth drive unit coupled to the fourth wheel;
the compensation torque value for each wheel of the plurality of wheels comprises a first compensation torque value for the first wheel, a second compensation torque value for the second wheel, a third compensation torque value for the third wheel, a fourth compensation torque value for the fourth wheel; and
the method comprises:
generating a first command for the first wheel based on the first compensation torque value, and transmit the first command to the first drive unit to cause the first drive unit to control torque of the first wheel;
generating a second command for the second wheel based on the second compensation torque value, and transmit the second command to the second drive unit to cause the second drive unit to control torque of the second wheel;
generating a third command for the third wheel based on the third compensation torque value, and transmit the third command to the third drive unit to cause the third drive unit to control torque of the third wheel; and
generating a fourth command for the fourth wheel based on the fourth compensation torque value, and transmit the fourth command to the fourth drive unit to cause the fourth drive unit to control torque of the fourth wheel.

15. The method of claim 9, comprising:
determining to deactivate a wheel slip control technique based on the state of the electric vehicle; and
blocking, responsive to deactivation of the wheel slip control technique, transmission of the one or more commands based on the compensation torque value.

16. The method of claim 9, comprising:
detecting that at least one of a brake of the electric vehicle, an electronic stability control program of the electric vehicle, or an anti-lock braking system of the electric vehicle is active; and
blocking, responsive to the detection, generation of the compensation torque value for each wheel of the plurality of wheels or transmission of the one or more commands corresponding to the compensation torque value for each wheel of the plurality of wheels to the one or more drive units of the plurality of wheels of the electric vehicle to control traction for the electric vehicle.

17. An electric vehicle, comprising:
a traction control system comprising one or more processors and memory to:
detect a wheel slip ratio for each wheel of a plurality of wheels of the electric vehicle;
receive, from a vehicle control unit of the electric vehicle, an input torque command;
determine a slip error for each wheel of the plurality of wheels based on the wheel slip ratio for each wheel of the plurality of wheels and a target wheel slip ratio for each wheel of the plurality of wheels;

identify a state of the electric vehicle and a condition of a road in contact with one or more of the plurality of wheels of the electric vehicle;

input the state of the electric vehicle and the condition of the road into a fuzzy-logic based control selection technique to select a traction control technique comprising one of a least-quadratic-regulator, a sliding mode controller, a loop-shaping based controller, or a model predictive controller;

generate, based on the traction control technique selected via the fuzzy-logic based control selection technique and the slip error for each wheel of the plurality of wheels, a compensation torque value for each wheel of the plurality of wheels;

transmit one or more commands corresponding to the compensation torque value for each wheel of the plurality of wheels to one or more drive units of the plurality of wheels of the electric vehicle to control traction for the electric vehicle; and regulate vertical moment of the electric vehicle based on a difference of individual motor torque caused by the compensation torque value for each wheel of the plurality of wheels.

18. The electric vehicle of claim 17, wherein the traction control system is configured to use the fuzzy-logic based control selection technique to adaptively switch the traction control technique during operation of the electric vehicle.

* * * * *